May 24, 1932.  T. A. KANE  1,860,034
DIRECTION SIGNAL FOR AUTOMOBILES
Filed Oct. 14, 1930  2 Sheets-Sheet 1
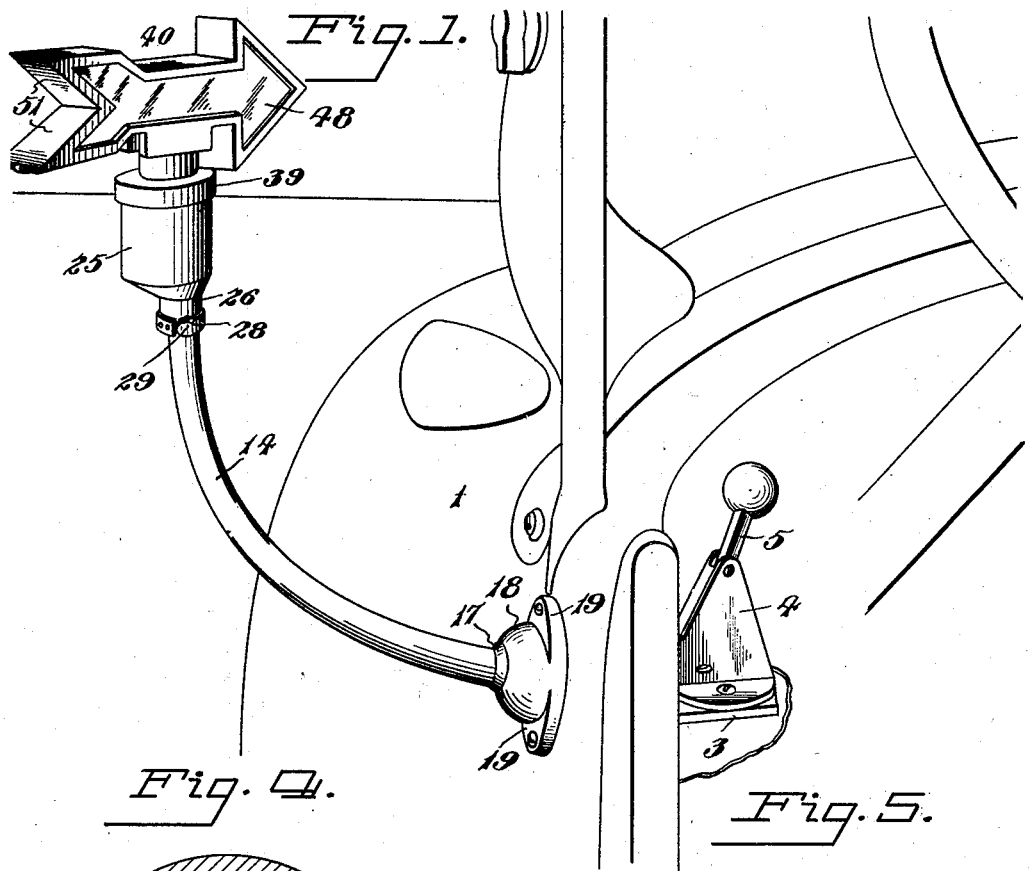
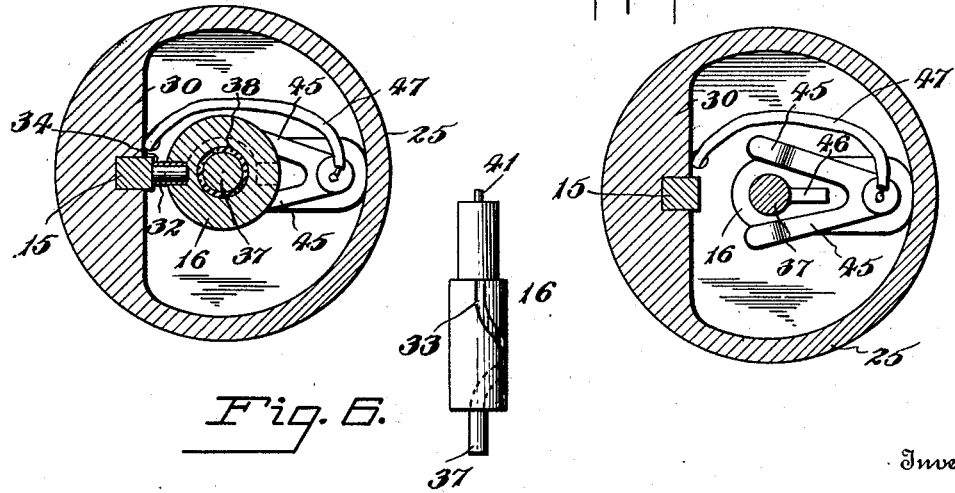
Inventor
T. A. Kane
By Lacey & Lacey,
Attorneys

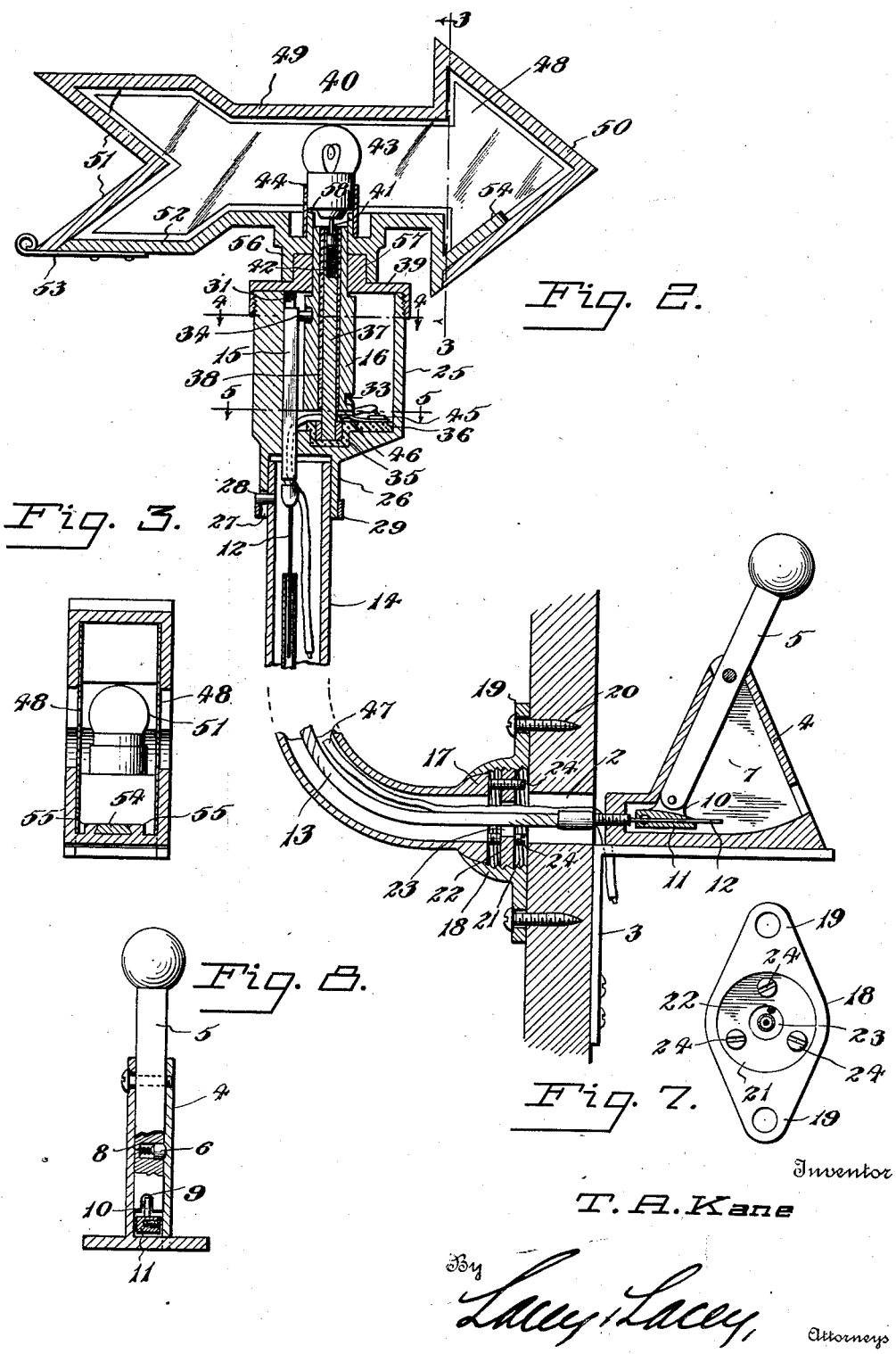
May 24, 1932.   T. A. KANE   1,860,034
DIRECTION SIGNAL FOR AUTOMOBILES
Filed Oct. 14, 1930   2 Sheets-Sheet 2

Patented May 24, 1932

1,860,034

UNITED STATES PATENT OFFICE

THOMAS ASA KANE, OF McMINNVILLE, OREGON

DIRECTION SIGNAL FOR AUTOMOBILES

Application filed October 14, 1930. Serial No. 488,622.

The object of this invention is to provide efficient means whereby the operator of a motor vehicle may apprise pedestrians and other motorists of an intention to change his course and the direction in which he intends to go. The invention provides a signal which is mounted upon the vehicle and may be operated from within the same so that an indicator will be turned in the direction in which it is intended to steer the vehicle. The invention also provides means whereby as the indicator is turned in one or the other direction it will be illuminated so that observation of the same will be assured and it will be visible at night as well as during the day. The invention is illustrated in the accompanying drawings and will be hereinafter first fully described and then more particularly defined in the appended claim.

In the drawings:

Figure 1 is a perspective view of my improved signal showing the manner in which it is mounted upon a vehicle, Fig. 2 is a vertical section taken through the signal and the operating mechanism, Fig. 3 is a detail section on the line 3—3 of Fig. 2, Fig. 4 is a detail horizontal section on the line 4—4 of Fig. 2, Fig. 5 is a similar view on the line 5—5 of Fig. 2, Fig. 6 is a detail elevation of a portion of the rotating shaft by which the signal or indicator is turned, Fig. 7 is a detail plan view of a portion of the bracket or mounting for the device, and Fig. 8 is a view, partly in elevation and partly in transverse vertical section, of the operating lever or handle.

A portion of a motor vehicle is shown at 1. In carrying out the present invention, an opening 2 is formed through the frame bar of the vehicle and a right angle bracket 3 is secured to said bar immediately below said opening on the inner side of the bar, as will be understood upon reference to Figs. 1 and 2. Mounted upon the bracket 3 is a casing 4 which is preferably triangular in form and at the apex of which an operating lever or handle 5 is fulcrumed. The lever extends into the casing and below its fulcrum carries a spring-pressed stud or latching element 6 which is adapted to seat in a recess 7 formed in the adjacent face of one side member of the casing 4 and thereby hold the lever normally in neutral position. The spring 8 which holds the locking element in its seating position will yield to positive force so that the lever may be easily rocked to one or the other side when desired but until force is positively applied will be held in its neutral vertical position. The lower end of the lever 5 is forked or slotted, as shown at 9, and within the slot is pivoted a lug 10 rising from a clamp 11 which may swing with the lever within the casing or housing 4 and receives and holds the end of a Bowden wire 12. Said wire 12 is housed within a flexible sheath 13 and extends through the opening 2 and is housed within a tubular bracket 14 which is mounted upon the outer side of the frame bar in alinement with said opening 2 and extends upwardly and outwardly from the vehicle. The outer end of the wire 12 is secured to a slide 15 which is adapted to rock the vertically disposed shaft 16, as will be presently more particularly set forth. The tubular bracket 14 is mounted upon the vehicle in such a manner that it may be easily adjusted so as to obtain the most advantageous results, and, to this end, the end of the tube which is disposed immediately adjacent the vehicle is enlarged to form a hemispherical head 17 which is disposed within a socket 18 which is secured to the side of the vehicle frame, as shown clearly in Fig. 2. It will be noted that the socket is provided with lugs 19 through which securing screws 20 may be passed and that the inner side of the socket is open and interiorly threaded, as shown at 21. Engaged within the threaded bore of the socket is a disk 22 having a central opening 23 for the passage of the sheath 13 and the wire 12 housed therein and equipped with set screws 24 disposed equi-distantly around the central opening 23 and arranged to bear against the end or side of the hemispherical head 17.

By properly adjusting the set screws, the head may be disposed so that the tubular bracket 14 will set at any desired angle to the vehicle and be firmly held in said position.

An end casing 25 is mounted on the outer upper end of the bracket 14 and may be held thereon in any desired manner, the drawings showing the casing provided with a neck or collar 26 which fits closely around the end of the tubular bracket and is provided with a notch 27 at one point in its edge adapted to receive a stud or pin 28 projecting radially from the tubular bracket, and a resilient retaining band 29 being secured at one end upon said neck or collar and having its free end spanning the notch 27 and formed with a seat in its upper edge to engage the said projection 28 whereby the casing will be held in proper position upon the tubular bracket. The wall of the casing 25 is thickened at one side, as shown at 30, and in said thickened portion is a vertically extending groove 31 which receives and guides the slide 15 which is secured on the end of the wire 12. At its upper extremity the slide 15 carries an inwardly projecting pin or stud 32 which is adapted to engage a spiral groove 33 formed in the circumference of the shaft 16, the pin or stud 32 being preferably equipped with a roller 34 to reduce frictional wear, as will be best understood upon reference to Fig. 4. The shaft 16 is seated in a bearing or recess 35 in the bottom of the casing 25 and this bearing is lined with insulation, as shown at 36. The shaft 16 has a central core 37 which extends below the lower end of the shaft and is rotatably fitted in the bearing or recess 35 and is insulated from the main body of the shaft, as shown at 38. The shaft extends through and is rotatably engaged in a cap 39 which is fitted on the upper end of the casing 25 and projects into the lower side or bottom of the indicator element 40 which, in the present instance, is shown as simulating an arrow. The upper end of the core 37 is hollow and a contact pin 41 is mounted therein and is yieldably projected upwardly by a spring 42 which is housed within the recess. The contact pin 41 engages the center contact of an incandescent lamp 43 which is fitted in a holder 44 within the indicator element. The holder 44 makes electrical connection with the rim of the lamp 43 and the tubular bracket 14 may be grounded through the metal parts of the vehicle to the usual battery or may be grounded to one terminal of the battery so that one side of the lamp circuit will be formed through the metal of the indicator element, the casing 25 and the tubular bracket 14. Upon the bottom of the casing 25 within the same are electrical contacts 45 in the form of spring fingers diverging to pass at opposite sides of the shaft 16, and upon the shaft is a radial contact stud 46 which normally is disposed between the fingers 45 but which will ride onto one of the fingers when the shaft is turned to either side. An electric cable 47 is secured at its upper end to the junction of the contact fingers 45 and passes therefrom through the tubular bracket 14 to be connected with the usual battery of the vehicle so that whenever the indicator 40 is turned to announce a change in direction of the vehicle, the lamp 43 will be energized and the signal illuminated.

The upper portion of the frame of the indicator 40 is cast in one piece of metal and makes the entire outline of the device, the sides of the same being normally open and equipped with panes 48 of colored glass or other transparent or translucent material so that the light may pass therethrough to attract the attention of pedestrians and motorists. The panes 48 will preferably be colored red inasmuch as this color is generally accepted as indicating danger and is known to easily attract attention. As clearly shown, the upper frame member defines the central shank or body 49 with a triangular head 50 at one end and inwardly converging webs 51 at the opposite end. The bottom of the frame is open and is filled by a plate 52 having an outline the counterpart of the upper portion of the frame and adapted to fit between the lower web 51 and the triangular head 50, being equipped at one end with a spring catch 53 to engage the end of the web 51 and being provided at its opposite end with a tongue or spur 54 adapted to pass within the triangular head 50 and rest upon the bottom web of the same between guide lugs 55 formed on the inner upper surface of the same. Upon reference to Fig. 3, it will be noted that the edges of the tongue 54 and of the guide lugs 55 are disposed obliquely so that the parts have a dove-tail engagement and will be thereby firmly held together. The bottom plate 52 is provided intermediate its ends with a depending socket 56 rotatably fitting upon the boss 57 formed centrally on the top of the cap 39 so that the indicator may rotate about said boss, as will be understood, and the upper end of the shaft 16 fits closely within a ring 58 formed on the bottom plate 52 and about which the lamp supporting ring or socket 44 is closely engaged. These parts fit so snugly together that any rotation of the shaft will be imparted directly to the indicator and the latter will be turned in the proper direction. Rotation of the shaft is effected by swinging the hand lever 5 to one or the other side. When the upper free end of the lever is swung to the right, as indicated in the drawings, the wire 12 will be pushed through the sheath 13 so that the slide 15 will be moved upwardly and the projection 32 will be caused to ride along the slot 33 and impart rotation to the shaft 16 so that the indicator will be turned to indicate an intention of steering to the right. If the lever 5 be rocked in the opposite direction, a movement of the other parts correspondingly will ensue and the indicator will be swung to indicate an intention of turning to the left.

From the foregoing description, taken in connection with the accompanying drawings, it will be seen that I have provided a very compact device which will operate efficiently and will provide a visible signal which will reliably inform persons in the immediate vicinity of the vehicle as to the operator's intentions. Normally, the arrow-shaped frame or indicator is disposed parallel with the side of the vehicle so that it indicates an intention to proceed straight ahead but it will respond instantly to movements of the controlling lever 5 and make known an intention to steer to either side.

Having thus described the invention, I claim:

A direction signal for motor vehicles comprising a casing, a vertically disposed shaft rotatably mounted within the casing and provided with a cam groove in its outer circumference, a slide mounted within the casing adjacent and parallel with the shaft, means within the casing for holding the slide to a rectilinear path, a projection on said slide engaged in the groove in the shaft, a rotatable indicator element mounted on the casing and connected to the shaft, and means connected with the lower end of the slide for reciprocating the slide.

In testimony whereof I affix my signature.

THOMAS ASA KANE. [L. S.]